(12) United States Patent
Kono et al.

(10) Patent No.: US 12,589,455 B2
(45) Date of Patent: Mar. 31, 2026

(54) SEAL REMOVAL JIG, SEAL REMOVAL METHOD, AND SEAL PORTION

(71) Applicant: MITSUBISHI HEAVY INDUSTRIES COMPRESSOR CORPORATION, Hiroshima (JP)

(72) Inventors: Yoshikuni Kono, Hiroshima (JP); Jun Koyanagi, Hiroshima (JP); Hiroaki Oka, Hiroshima (JP)

(73) Assignee: MITSUBISHI HEAVY INDUSTRIES COMPRESSOR CORPORATION, Hiroshima (JP)

( * ) Notice: Subject to any disclaimer, the term of this patent is extended or adjusted under 35 U.S.C. 154(b) by 0 days.

(21) Appl. No.: 19/042,123

(22) Filed: Jan. 31, 2025

(65) Prior Publication Data

US 2025/0269478 A1     Aug. 28, 2025

(30) Foreign Application Priority Data

Feb. 22, 2024     (JP) ................................. 2024-025219

(51) Int. Cl.
B23P 19/04          (2006.01)

(52) U.S. Cl.
CPC .................................. B23P 19/047 (2013.01)

(58) Field of Classification Search
CPC ......... B23P 19/047; B23P 19/04; B23P 19/00; F02C 7/28; F02C 7/00
USPC .................................... 29/426.5, 426.1, 592
See application file for complete search history.

(56) References Cited

U.S. PATENT DOCUMENTS

| | | | | | |
|---|---|---|---|---|---|
| 3,150,694 | A | * | 9/1964 | Meier .................. | B65B 13/345 |
| | | | | | 140/123.6 |
| 3,494,682 | A | * | 2/1970 | Keller ................. | F16C 33/7813 |
| | | | | | 277/572 |
| 4,649,618 | A | * | 3/1987 | Harrison ............. | B25B 27/0028 |
| | | | | | 29/267 |
| 5,709,018 | A | * | 1/1998 | Dugan .................. | B23P 19/084 |
| | | | | | 29/263 |
| 7,146,697 | B2 | * | 12/2006 | Chan ..................... | F01D 25/285 |
| | | | | | 29/278 |
| 7,347,424 | B2 | * | 3/2008 | Madigan .............. | F16J 15/3268 |
| | | | | | 29/402.02 |

(Continued)

FOREIGN PATENT DOCUMENTS

| | | | |
|---|---|---|---|
| JP | 2023-150035 A | 10/2023 | |
| JP | 2023150035 | * 10/2023 ............. | F04D 29/08 |

*Primary Examiner* — Lawrence Averick
(74) *Attorney, Agent, or Firm* — Osha Bergman Watanabe & Burton LLP

(57)          ABSTRACT

A seal removal jig is used for removing a seal portion from a casing of a rotary machine. The seal removal jig includes a jig body pushed up from below in a vertical direction by a jack, and a jig fixing portion that detachably fixes the jig body to an end surface of the seal portion. The jig body includes a jig contact portion that is contactable with an end surface of an upper half seal portion or a lower half seal portion in a circumferential direction about an axis of the rotary machine; and a jig protrusion protruding outward in a radial direction with respect to the jig contact portion and pushed up from below in the vertical direction by the jack. The ratio of a first distance to an outside diameter of the upper half seal portion or the lower half seal portion is 0.01 or more and 0.1 or less.

5 Claims, 6 Drawing Sheets

(56)                    References Cited

U.S. PATENT DOCUMENTS

| | | | | |
|---|---|---|---|---|
| 7,996,971 | B2 * | 8/2011 | Newton .................... | B25B 9/02 |
| | | | | 269/3 |
| 8,011,671 | B2 * | 9/2011 | Madigan ............. | F16J 15/3268 |
| | | | | 277/576 |
| 9,027,217 | B2 * | 5/2015 | Cranford ................ | E21B 19/00 |
| | | | | 166/85.4 |
| 9,375,697 | B2 * | 6/2016 | McAdams ............... | B23P 6/00 |
| 10,166,663 | B1 * | 1/2019 | Christensen ............ | B25B 27/02 |
| 11,285,571 | B1 * | 3/2022 | Vierhout ............. | B25B 27/0028 |
| 2005/0217096 | A1 * | 10/2005 | Chan ................... | B25B 27/0028 |
| | | | | 29/235 |
| 2006/0249915 | A1 * | 11/2006 | Madigan ............. | F16J 15/3268 |
| | | | | 277/551 |
| 2009/0078089 | A1 * | 3/2009 | Newton ............. | B25B 27/0092 |
| | | | | 244/129.1 |
| 2009/0189357 | A1 * | 7/2009 | Madigan ............. | F16J 15/3268 |
| | | | | 277/551 |
| 2013/0025105 | A1 * | 1/2013 | Cranford ................ | E21B 19/00 |
| | | | | 29/700 |
| 2015/0258521 | A1 * | 9/2015 | McAdams ............... | B23P 6/00 |
| | | | | 29/402.08 |
| 2016/0325416 | A1 * | 11/2016 | Rathbun ................... | F01L 3/10 |

* cited by examiner

SEAL REMOVAL JIG, SEAL REMOVAL METHOD, AND SEAL PORTION

CROSS-REFERENCE TO RELATED APPLICATIONS

This application claims the benefit of priority to Japanese Patent Application Number 2024-025219 filed on Feb. 22, 2024. The entire contents of the above-identified application are hereby incorporated by reference.

TECHNICAL FIELD

The present disclosure relates to a seal removal jig, a seal removal method, and a seal portion.

RELATED ART

As a compressor, a multistage centrifugal compressor including a plurality of stages of impellers for compressing gas is known. The multistage centrifugal compressor sequentially compresses, by the plurality of stages of impellers, a gas sucked into a casing from an inlet, and discharges it to an outside of the casing from a discharge port.

In such a centrifugal compressor, an impeller is accommodated in the casing. The casing includes a plurality of diaphragms covering the impeller, and an external casing having a tubular shape covering the plurality of diaphragms from an outer side in the radial direction. For example, Japanese Patent Application Laid-Open No. 2023-150035 discloses a centrifugal compressor in which a space between a rotating impeller and a stationary diaphragm is sealed by a seal portion. The seal portion disclosed in Japanese Patent Application Laid-Open No. 2023-150035 seals a radial gap between a cover of the impeller and the diaphragm.

SUMMARY

Such a seal portion is formed in a semi-annular shape. The seal portion is fixed to an inside surface of a member constituting a casing such as a diaphragm divided up and down. The casing and the seal portion become large as the size of the centrifugal compressor increases. Therefore, the work of removing the seal portion from the casing at the time of maintenance becomes large-scale work. Furthermore, in a case where a working fluid to be compressed is a fluid such as an ethylene-based gas, fusing occurs between the casing and the seal portion, and the casing becomes more difficult to remove. Therefore, it is desired to easily remove the seal portion with respect to the casing.

The present disclosure has been made to solve the above problems, and an object of the present disclosure is to provide a seal removal jig, a seal removal method, and a seal portion that can easily remove a seal portion with respect to a casing.

In order to solve the above problem, a seal removal jig according to the present disclosure is a seal removal jig used for removing a seal portion from a casing of a rotary machine, the seal removal jig including: a jig body configured to be pushed up from below in a vertical direction by a jack; and a jig fixing portion configured to detachably fix the jig body to the seal portion, in which the casing includes a casing inside surface configured to internally accommodate an impeller rotatable about an axis, the casing inside surface opposing an outside surface of the impeller in a radial direction with respect to the axis, the seal portion is disposed on the casing inside surface, and is configured to seal a gap with the impeller by opposing the outside surface of the impeller from an outer side in the radial direction, the casing further includes an upper half forming an upper part in the vertical direction with respect to the axis and having a cross section perpendicular to the axis formed in a semicircular arc shape, and a lower half forming a lower part in the vertical direction with respect to the axis and having a cross section perpendicular to the axis formed in a semicircular arc shape, the seal portion includes an upper half seal portion configured to be attached to the upper half, and a lower half seal portion configured to be attached to the lower half, the jig body includes a jig contact portion configured to come into contact with an end surface of the upper half seal portion or the lower half seal portion in a circumferential direction about the axis, and a jig protrusion protruding outward in the radial direction with respect to the jig contact portion and configured to be pushed up from below in the vertical direction by a jack, and a ratio of a first distance to an outside diameter of the upper half seal portion or the lower half seal portion is 0.01 or more and 0.1 or less when a distance in a horizontal direction between a fixing center position of the jig fixing portion with respect to the end surface and a loaded position of the jig protrusion that the jack comes into contact with and to which a force from the jack is applied is the first distance.

A seal removal method according to the present disclosure is a seal removal method using the seal removal jig, the seal removal method including steps of: disposing the upper half or the lower half such that the end surface of the upper half seal portion or the lower half seal portion faces upward in the vertical direction; disposing the jig body on the end surface in a state of being in contact and fixing the end surface and the jig body with the jig fixing portion; and pushing up the jig protrusion upward from below in the vertical direction by the jack.

A seal portion according to the present disclosure is a seal portion configured to seal a gap between a casing including a casing inside surface configured to internally accommodate an impeller rotatable about an axis, the casing inside surface opposing an outside surface of the impeller in a radial direction with respect to the axis, an upper half forming an upper part in a vertical direction with respect to the axis and having a cross section perpendicular to the axis formed in a semicircular arc shape, and a lower half forming a lower part in the vertical direction with respect to the axis and having a cross section perpendicular to the axis formed in a semicircular arc shape and the impeller, in which a cross-sectional shape of the seal portion when viewed from a circumferential direction is formed in an L shape, the seal portion is disposed on the casing inside surface so as to oppose an outside surface of the impeller from an outer side in the radial direction, the seal portion includes an upper half seal portion attached to the upper half and a lower half seal portion attached to the lower half, a seal attachment recess recessed in the radial direction from the casing inside surface is formed in the upper half and the lower half, the upper half seal portion and the lower half seal portion include a seal body in which a seal surface opposing the outside surface of the impeller from an outer side in the radial direction is formed, and a seal insertion portion protruding from the seal body in the radial direction and insertable in the radial direction into the seal attachment recess, and in the seal insertion portion, a surface opposing a recess inner surface extending in the radial direction in the seal attachment recess is formed only of an insertion surface configured to come into slide contact with the recess inner surface and extends in the radial direction.

According to the seal removal jig, the seal removal method, and the seal portion of the present disclosure, a seal portion can be easily removed from the casing.

BRIEF DESCRIPTION OF DRAWINGS

The disclosure will be described with reference to the accompanying drawings, wherein like numbers reference like elements.

DESCRIPTION OF EMBODIMENTS

Figure 1:
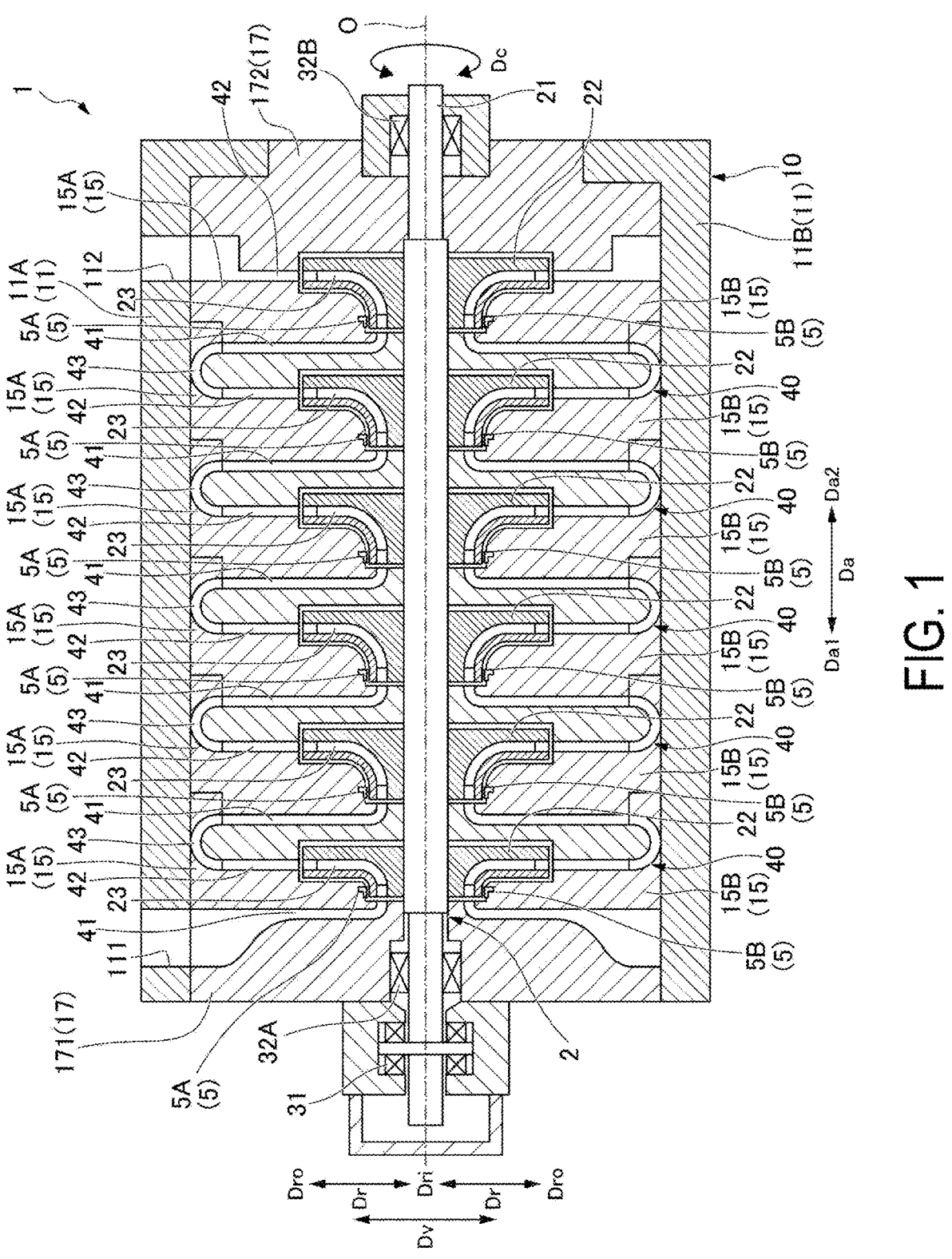
FIG. 1 is a cross-sectional view of a centrifugal compressor according to an embodiment of the present disclosure.

Hereinafter, embodiments for carrying out a seal removal jig 8, a seal removal method S1, and a seal portion 5 according to the present disclosure will be described with reference to the accompanying drawings. However, the present disclosure is not limited only to these embodiments. Configuration of Centrifugal Compressor First, a centrifugal compressor 1 applied with the seal removal jig 8, the seal removal method S1, and the seal portion 5 of the present disclosure will be described. As illustrated in FIG. 1, the centrifugal compressor 1 in the present embodiment is a uniaxial multistage centrifugal compressor. The centrifugal compressor 1 mainly includes a rotor shaft 2 that rotates about an axis O, a casing 10 formed so as to surround the rotor shaft 2, and the seal portion 5. Configuration of Rotor Shaft The rotor shaft 2 extends in an axial direction Da. The rotor shaft 2 extends so as to penetrate an inside of the casing 10 along an axis O. The rotor shaft 2 includes a rotor shaft body 21 and impeller 22.

In the present embodiment, the direction in which the axis O extends is an axial direction Da. The axial direction Da of the rotor shaft 2 is along a horizontal plane. That is, the axis O extends horizontally. The radial direction with respect to the axis O is simply a radial direction Dr. A direction around the rotor shaft 2 about the axis O is defined as a circumferential direction Dc.

The rotor shaft body 21 is formed in a cylindrical shape extending in the axial direction Da. An end portion on a first side Da1 in the axial direction Da of the rotor shaft body 21 is supported by the casing 10 rotatably about the axis O by a journal bearing 32A and a thrust bearing 31. An end portion on a second side Da2 in the axial direction Da of the rotor shaft body 21 is supported by the casing 10 rotatably about the axis O by a journal bearing 32B.

The impeller 22 is disposed on an outer side Dro in the radial direction Dr with respect to the axis O with respect to the rotor shaft body 21. A plurality of the impellers 22 are arranged apart in the axial direction Da in the casing 10.

Each impeller 22 compresses and discharges a working fluid (e.g., gas) supplied from the first side Da1 in the axial direction Da to the outer side Dro in the radial direction Dr.

Each impeller 22 has an impeller flow path 23 formed internally. The cross-sectional area of the impeller flow path 23 gradually decreases from an inner side Dri in the radial direction Dr toward the outer side Dro in the radial direction Dr. Due to this, the working fluid flowing through the impeller flow path 23 in a state where the impeller 22 is rotating is gradually compressed to have a high pressure. Configuration of Casing The casing 10 is formed so as to surround the rotor shaft body 21 and the plurality of impellers 22 from the outer side Dro in the radial direction Dr. The casing 10 includes an external casing 11, an inlet 111, a discharge port 112, a plurality of diaphragms 15, and a head 17.

The external casing 11 is formed in a tubular shape extending in the axial direction Da. The external casing 11 is formed so as to cover the rotor shaft 2, the plurality of diaphragms 15, and the head 17 from the outer side Dro in the radial direction Dr.

The external casing 11 includes an upper half casing 11A above a vertical direction Dv and a lower half casing 11B below the vertical direction Dv. The upper half casing 11A and the lower half casing 11B are fixed by detachable fixing means such as bolts.

The upper half casing 11A has a cross section orthogonal to the axis O that extends in the axial direction Da in a semi-annular shape about the axis O. The upper half casing 11A opens downward in the vertical direction Dv so that the plurality of diaphragms 15 are fitted. Due to this, the upper half casing 11A covers, from above, the outside surfaces of the plurality of diaphragms 15 accommodated internally.

The lower half casing 11B has a cross section orthogonal to the axis O that extends in the axial direction Da in a semi-annular shape about the axis O. The lower half casing 11B opens upward in the vertical direction Dv so that the plurality of diaphragms 15 are fitted. Due to this, the lower half casing 11B covers, from below, the outside surfaces of the plurality of diaphragms 15 accommodated internally.

The inlet 111 is formed on the first side Da1 in the axial direction Da of the external casing 11. The inlet 111 causes the working fluid to flow into the external casing 11 from the outside.

The discharge port 112 is formed on the second side Da2 in the axial direction Da of the external casing 11. The discharge port 112 discharges, to the outside of the external casing 11, the working fluid compressed through all the impellers 22 in the external casing 11. That is, the discharge port 112 is disposed away on the second side Da2 in the axial direction Da with respect to the inlet 111.

The plurality of diaphragms 15 are arranged on the inner side Dri in the radial direction Dr of the external casing 11. The plurality of diaphragms 15 are formed in a tubular shape extending in the axial direction Da as a whole so as to cover the impellers 22 of the respective stages. Each diaphragm 15 is formed in a disk shape about the axis O. The plurality of diaphragms 15 are fixed to each other by welding or bolts between adjacent diaphragms 15 stacked in the axial direction Da. The plurality of diaphragms 15 are fixed to each other to cover the periphery of the rotor shaft 2, and internally form a casing flow path 40 connecting the plurality of impellers 22. The plurality of diaphragms 15 constitute a bundle together with the rotor shaft 2, the head 17, the journal bearings 32A and 32B, and the thrust bearing 31. The bundle is accommodated in the external casing 11. In the bundle, the plurality of diaphragms 15, the rotor shaft 2, the head 17, the journal bearings 32A and 32B, and the thrust bearing 31 are integrally in a state of being movable together.

Each diaphragm 15 includes an upper half diaphragm (upper half) 15A forming a semi-annular shape above in the vertical direction Dv with respect to a center line of the rotor shaft 2 and a lower half diaphragm (lower half) 15B forming a semi-annular shape below. The upper half diaphragm 15A and the lower half diaphragm 15B are fixed by detachable fixing means such as bolts.

The upper half diaphragm 15A extends in the circumferential direction Dc such that a cross section orthogonal to the axis O forms a semi-annular shape about the axis O. The upper half diaphragm 15A opens downward in the vertical direction Dv so as to cover an upper half part of the impeller 22. Due to this, the upper half diaphragm 15A internally accommodates the upper half part of the impeller 22 so as to cover the impeller 22 from above.

The lower half diaphragm 15B extends in the circumferential direction Dc such that a cross section orthogonal to the axis O forms a semi-annular shape about the axis O. The lower half diaphragm 15B opens upward in the vertical direction Dv so that a lower half part of the impeller 22 is fitted. Due to this, the lower half diaphragm 15B internally accommodates the lower half part of the impeller 22 so as to cover the impeller 22 from below.

The plurality of diaphragms 15 include, as the casing flow path 40, an introduction flow path 41, a diffuser flow path 42, and a return flow path 43.

The introduction flow path 41 guides the working fluid from the outer side Dro in the radial direction Dr toward the inner side Dri in the radial direction Dr. The introduction flow path 41 changes the working fluid toward the inner side Dri in the radial direction Dr into a flow toward the second side Da2 in the axial direction Da and guides the working fluid to the impeller 22. In this manner, the introduction flow path 41 changes the flow direction of the working fluid to the second side Da2 in the axial direction Da and guides the working fluid to the impeller flow path 23 of the impeller 22.

The diffuser flow path 42 extends from the inner side Dri toward the outer side Dro in the radial direction Dr. An end portion of the inner side Dri in the radial direction Dr in the diffuser flow path 42 communicates with an end portion of the outer side Dro in the radial direction Dr of the impeller flow path 23. The diffuser flow path 42 guides the working fluid compressed by the impeller 22 from the inner side Dri in the radial direction Dr to the outer side Dro in the radial direction Dr.

The return flow path 43 reverses the flow direction of the working fluid flowing from the inner side Dri in the radial direction Dr toward the outer side Dro in the radial direction Dr through the diffuser flow path 42. The return flow path 43 guides the working fluid flowing toward the outer side Dro in the radial direction Dr to the inner side Dri in the radial direction Dr. One end (first side Da1 in the axial direction Da) of the return flow path 43 upstream in the flow direction of the working fluid communicates with the diffuser flow path 42. The other end side (second side Da2 in the axial direction Da) of the return flow path 43 downstream in the flow direction of the working fluid communicates with the next introduction flow path 41.

A pair of the heads 17 are disposed so as to close openings at both ends in the axial direction Da of the external casing 11 having a tubular shape. It is a member having an annular shape about the axis O. The pair of heads 17 are disposed inside the external casing 11. The head 17 of the present embodiment includes a first casing head 171 and a second casing head 172.

The first casing head 171 is disposed so as to close the opening on the first side Da1 in the axial direction Da of the external casing 11. That is, the first casing head 171 is disposed adjacent to the first side Da1 in the axial direction Da with respect to the plurality of diaphragms 15. An inlet scroll for taking an external working fluid into the casing flow path 40 through the inlet 111 is formed between the first casing head 171 and the diaphragm 15 of the first stage disposed closest to the first side Da1 in the axial direction Da among the plurality of diaphragms 15. The first casing head 171 is fixed to the plurality of integrated diaphragms 15 by bolts or the like. Due to this, the first casing head 171 is integrated with the diaphragm 15.

The second casing head 172 is disposed so as to close the opening on the second side Da2 in the axial direction Da of the external casing 11. That is, the second casing head 172 is disposed adjacent to the second side Da2 in the axial direction Da with respect to the plurality of diaphragms 15. Therefore, the second casing head 172 is adjacent to the diaphragm 15 of the last stage disposed closest to the second side Da2 in the axial direction Da among the plurality of diaphragms 15. The second casing head 172 is fixed to the plurality of integrated diaphragms 15 by bolts or the like. Due to this, the second casing head 172 is integrated with the diaphragm 15.

Detailed Configuration of Impeller

Next, a detailed configuration of the impeller 22 will be described with reference to FIG. 2. The impeller 22 is a so-called closed impeller including a disk 25, a blade 26, and a cover 27.

The disk 25 is formed in a disk shape about the axis O. The disk 25 includes a through-hole 251 having a circular shape about the axis O and penetrating in the axial direction Da. The impeller 22 is integrally fixed to the rotor shaft 2 by fitting the inside surface of the through-hole 251 into the outside surface of the rotor shaft 2.

A surface of the disk 25 facing the second side Da2 in the axial direction Da is a disk rear surface 252 having a planar shape orthogonal to the axis O. A disk main surface 253 is formed from an end portion of the disk 25 on the first side Da1 in the axial direction Da of the through-hole 251 to an end portion of the disk rear surface 252 on the outer side Dro in the radial direction Dr. The disk main surface 253 extends so as to gradually expand toward the outer side Dro in the radial direction Dr from the first side Da1 toward the other side in the axial direction Da. A part of the disk main surface 253 on the first side Da1 in the axial direction Da faces the outer side Dro in the radial direction Dr, and is gradually curved to face the first side Da1 in the axial direction Da toward the second side Da2 in the axial direction Da. That is, the disk main surface 253 gradually increases in diameter from the first side Da1 toward the other side in the axial direction Da. The disk main surface 253 has a concave curved surface shape.

The plurality of blades 26 are disposed on the disk main surface 253 of the disk 25 at intervals in the circumferential direction Dc of the axis O. Each blade 26 is curved rearward in the rotation direction of the impeller 22 from the inner side Dri in the radial direction Dr toward the outer side Dro in the radial direction Dr. Each blade 26 extends while forming a curved surface protruding forward in the rotation direction.

The cover 27 covers the plurality of blades 26 from the first side Da1 in the axial direction Da. The cover 27 is disposed to oppose the disk 25 so as to hold the blade 26 between the cover 27 and the disk 25. The inside surface (hereinafter, called a cover inside surface 271) of the cover 27 is formed so as to gradually increase in diameter from the first side Da1 toward the other side in the axial direction Da.

The cover inside surface 271 is curved while opposing the disk main surface 253 so as to correspond to the disk main surface 253. An end portion of the blade 26 on an opposite side to the disk main surface 253 is fixed to the cover inside surface 271. The cover inside surface 271, the disk main surface 253, and the blades 26 form the impeller flow path 23 extending to the outer side Dro in the radial direction Dr while being curved in the circumferential direction Dc from the first side Da1 toward the other side in the axial direction Da therebetween. The cover 27 has a cover outside surface 272 opposing the inside surface of the casing 10 in a direction opposite to the cover inside surface 271. The cover outside surface 272 is an outside surface of the impeller 22.

Impeller Peripheral Structure of Casing

Next, a detailed structure of the casing 10 will be described with reference to FIG. 2. The casing 10 includes, between the introduction flow path 41 and the diffuser flow path 42, an impeller accommodation portion 151 as a space for accommodating the impeller 22 in the inner side Dri. A plurality of the impeller accommodation portions 151 are formed in accordance with the number of the plurality of impellers 22. One impeller accommodation portion 151 is formed in one diaphragm 15.

A part of the impeller 22 opposing the cover outside surface 272 is a casing inside surface 152. An end portion on the second side Da2 in the axial direction Da of the casing inside surface 152 is connected to the diffuser flow path 42. An end portion on the first side Da1 in the axial direction Da of the casing inside surface 152 is connected to the introduction flow path 41. The casing inside surface 152 is formed as an inside surface facing the inner side Dri in the radial direction Dr in the diaphragm 15.

Figure 4:
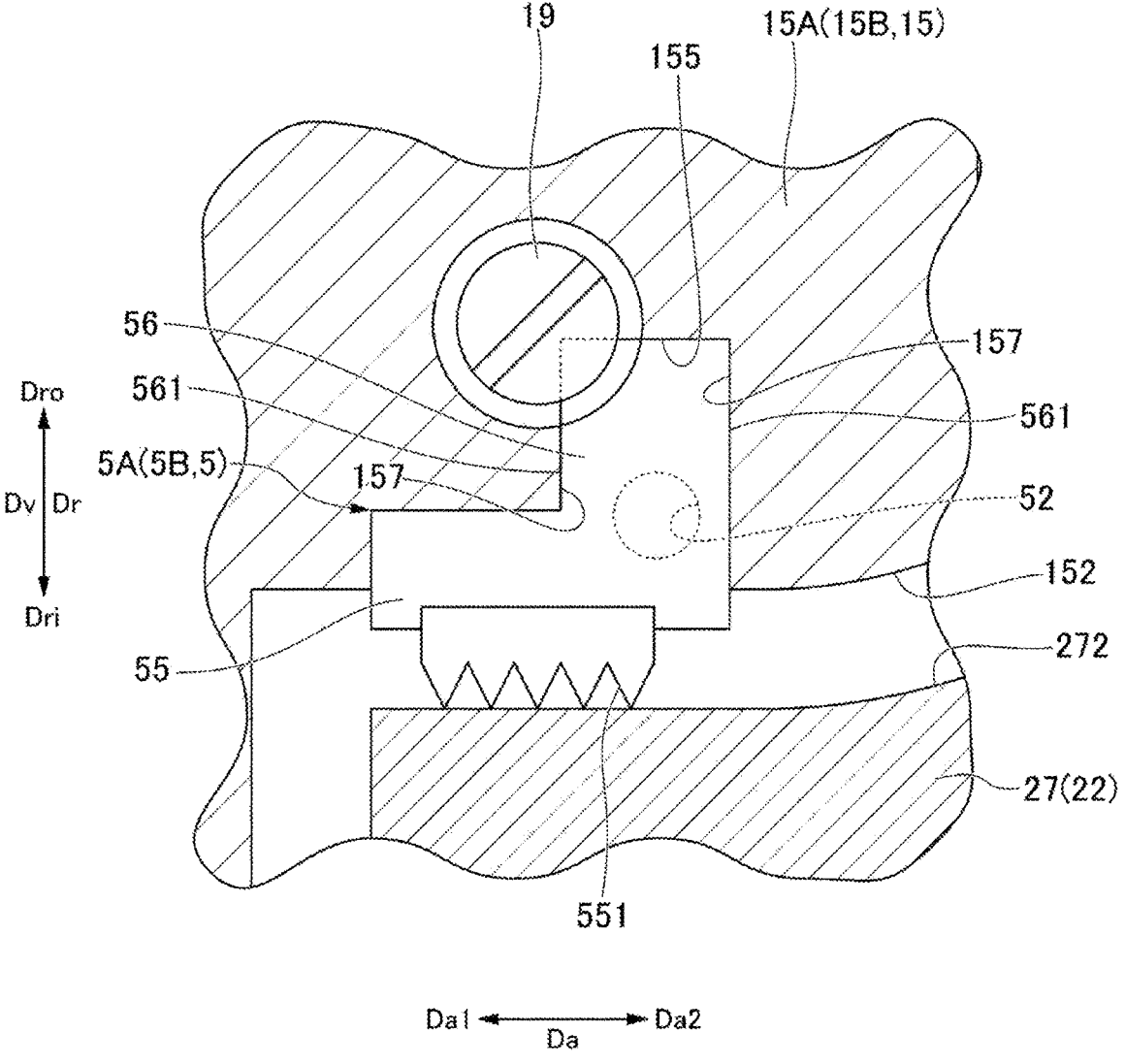
FIG. 4 is an enlarged cross-sectional view of a main portion for explaining the seal portion.

The casing inside surface 152 has a seal attachment recess 155. The seal attachment recess 155 is recessed from the casing inside surface 152 toward the outer side Dro in the radial direction Dr. As illustrated in FIG. 4, a recess inner surface 157, which is the inner surface of the seal attachment recess 155, is a flat surface extending in the radial direction Dr. The recess inner surface 157 is a flat surface on which no protrusion or recess is formed. That is, the seal attachment recess 155 is recessed only on the outer side Dro in the radial direction Dr in a state where the recess inner surface 157 is smooth. The seal attachment recess 155 is formed in the upper half diaphragm 15A and the lower half diaphragm 15B.

Seal Portion

Figure 2:
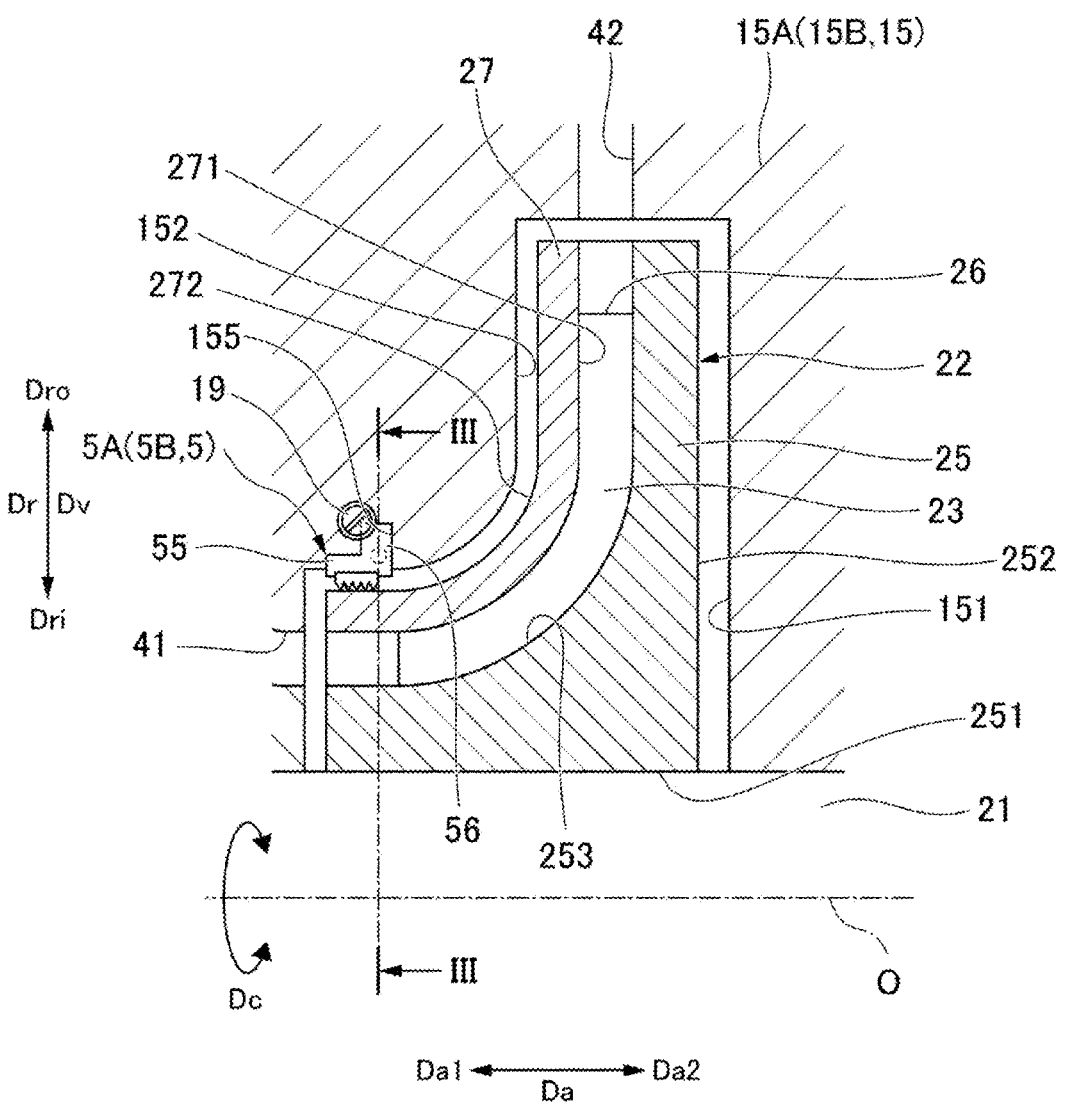
FIG. 2 is an enlarged cross-sectional view illustrating a configuration around an impeller of the centrifugal compressor.

As illustrated in FIG. 2, the seal portion 5 can seal a gap between the casing 10 and the impeller 22. The seal portion 5 of the present embodiment is a labyrinth seal that seals a gap in the radial direction Dr between the cover outside surface 272 and the casing inside surface 152. The seal portion 5 is disposed on the casing inside surface 152 so as to oppose the cover outside surface 272, which is the outside surface of the impeller 22, from the outer side Dro in the radial direction Dr. As illustrated in FIG. 1, the seal portion 5 includes an upper half seal portion 5A attached to the upper half diaphragm 15A and a lower half seal portion 5B attached to the lower half diaphragm 15B.

Figure 3:
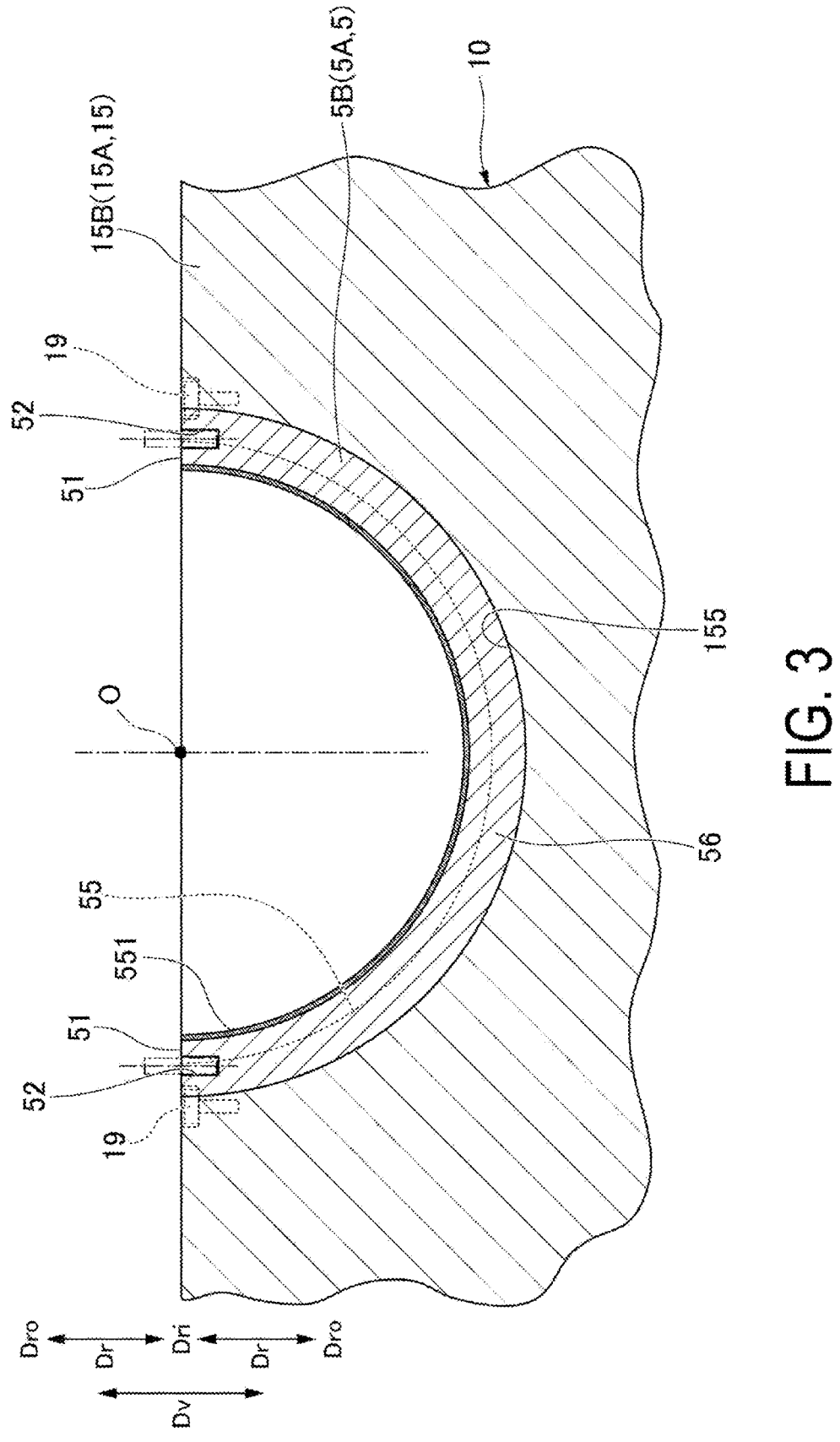
FIG. 3 is a cross-sectional view illustrating a seal portion of the centrifugal compressor as viewed from an axial direction.

As illustrated in FIG. 2, the upper half seal portion 5A is fixed to the upper half diaphragm 15A in a state of being inserted into the seal attachment recess 155 of the upper half diaphragm 15A. As illustrated in FIG. 3, movement of the upper half seal portion 5A in the vertical direction Dv is restricted by a head portion of a restriction bolt 19 fixed to the upper half diaphragm 15A, whereby the upper half seal portion 5A cannot fall off from the upper half diaphragm 15A. As illustrated in FIG. 2, the lower half seal portion 5B is fixed to the lower half diaphragm 15B in a state of being inserted into the seal attachment recess 155 of the lower half diaphragm 15B. As illustrated in FIG. 3, movement of the lower half seal portion 5B in the vertical direction Dv is restricted by the head portion of the restriction bolt 19 fixed to the lower half diaphragm 15B, whereby the lower half seal portion 5B cannot fall off from the lower half diaphragm 15B. The upper half seal portion 5A and the lower half seal portion 5B are formed in the same shape. The upper half seal portion 5A and the lower half seal portion 5B are formed in a semi-annular shape when viewed from the axial direction Da. A bolt insertion hole 52 is formed in an end surface 51 of the upper half seal portion 5A and the lower half seal portion 5B in the circumferential direction Dc. The end surface 51 of the upper half seal portion 5A or the lower half seal portion 5B is disposed at the same position as a dividing surface that is an end surface of the upper half diaphragm 15A or the lower half diaphragm 15B in the circumferential direction Dc in a state of being attached to the upper half diaphragm 15A or the lower half diaphragm 15B. It is screw hole that is fixed by a bolt such as a long screw having no head portion being inserted into the bolt insertion hole 52. The upper half seal portion 5A and the lower half seal portion 5B are fixed to each other by fixing bolts to the bolt insertion holes 52 of the upper half seal portion 5A and the lower half seal portion 5B. As illustrated in FIG. 4, the upper half seal portion 5A and the lower half seal portion 5B include a seal body 55 and a seal insertion portion 56.

The seal body 55 has a seal surface 551 formed opposing the outside surface of the impeller 22 from the outer side Dro in the radial direction Dr. The seal body 55 is formed in a semi-annular shape having the seal surface 551 as an inside surface. A fin protruding toward the outside surface of the impeller 22 is formed on the seal surface 551.

The seal insertion portion 56 protrudes from the seal body 55 toward the outer side Dro in the radial direction Dr. The seal insertion portion 56 can be inserted into the seal attachment recess 155 in the radial direction Dr. The seal insertion portion 56 protrudes from an end portion on the second side Da2 of the seal body 55 in the axial direction Da. Due to this, the seal portion 5 has an L shaped cross-sectional shape when viewed from the circumferential direction Dc. The seal insertion portion 56 includes an insertion surface 561 that is a surface opposing the recess inner surface 157. The insertion surface 561 is formed to extend in the radial direction Dr as a flat surface that can come into slide contact with the recess inner surface 157. That is, the insertion surface 561 is a smooth surface without unevenness such as a protrusion, a recess, and a curved surface that are caught by the recess inner surface 157.

Seal Removal Jig

Figure 5:
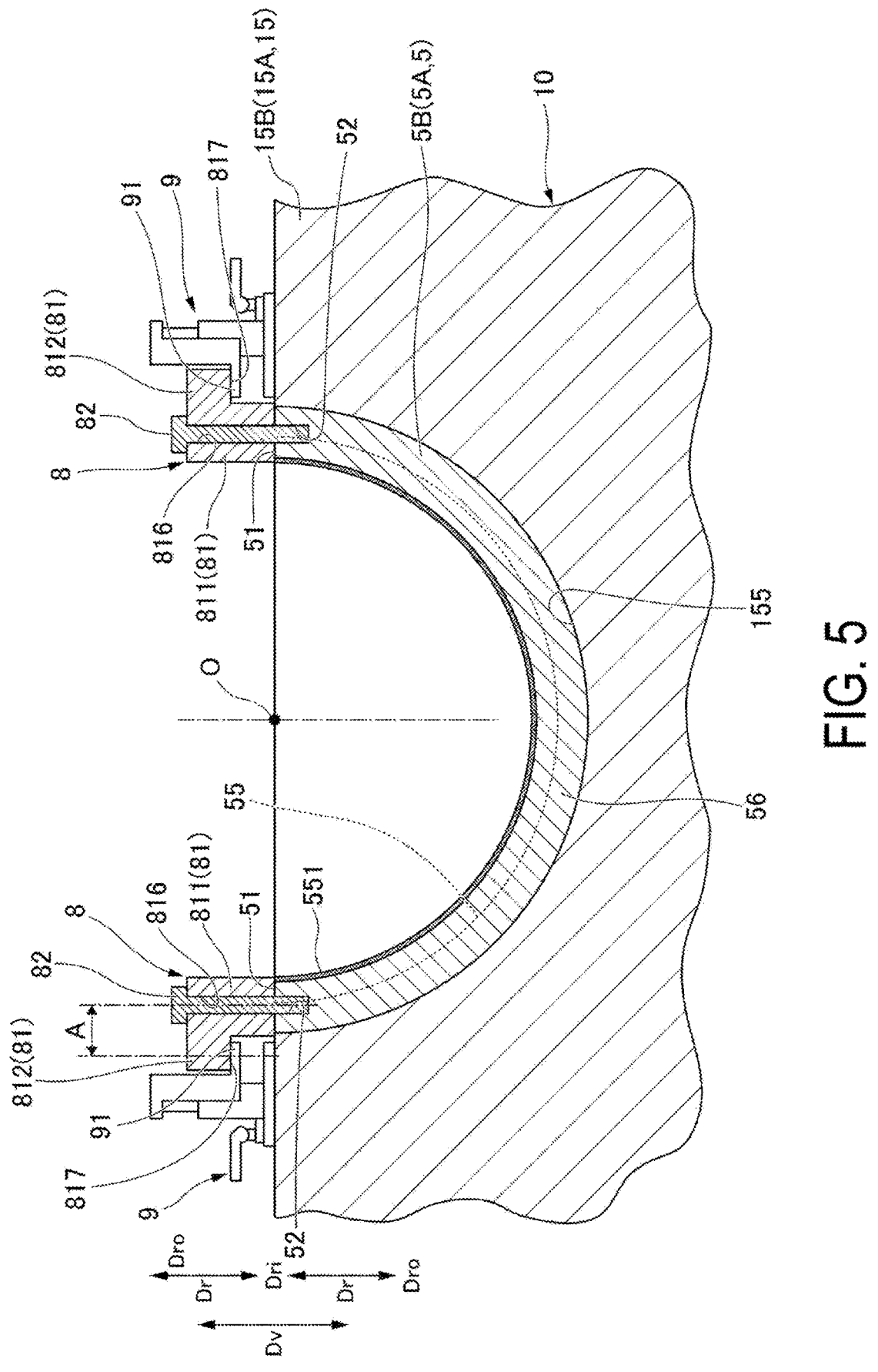
FIG. 5 is a cross-sectional view illustrating the seal removal jig of the present disclosure.

Next, the seal removal jig 8 used for removing the seal portion 5 from the casing 10 will be described. As illustrated in FIG. 5, the seal removal jig 8 of the present embodiment is used when the upper half seal portion 5A is removed from the upper half diaphragm 15A and when the lower half seal portion 5B is removed from the lower half diaphragm 15B. The seal removal jig 8 is disposed one by one with respect to the end surface 51 of each of the upper half seal portion 5A or the lower half seal portion 5B. The seal removal jig 8 of the present embodiment includes a jig body 81 and a jig fixing portion 82. Therefore, the jig body 81 and the jig fixing portion 82 can be independently disposed on both the end surfaces 51 of the upper half seal portion 5A and the lower half seal portion 5B in the circumferential direction Dc.

The jig body 81 is pushed up from below in the vertical direction Dv by the jack 9. The jig body 81 of the present embodiment includes a jig contact portion 811 and a jig protrusion 812.

The jig contact portion 811 is contactable with the end surface 51 of the upper half seal portion 5A or the lower half seal portion 5B in the circumferential direction Dc. The jig contact portion 811 is formed in a rectangular shape whose lower end is contactable with the end surface 51 of the seal portion 5. The jig body 81 has a jig through-hole 816 penetrating the inside in the vertical direction Dv. The jig through-hole 816 is formed in a size that allows insertion of the jig fixing portion 82 to be inserted into the bolt insertion holes 52 formed in the upper half seal portion 5A and the lower half seal portion 5B.

The jig protrusion 812 is pushed up from below in the vertical direction Dv by the jack 9. The jig protrusion 812 protrudes toward the outer side Dro in the radial direction Dr with respect to the jig contact portion 811. The jig protrusion 812 is formed at a position away in the vertical direction Dv from the lower end of the jig contact portion 811. The jig protrusion 812 protrudes from the upper end of the jig contact portion 811 only toward the outside in the horizontal direction that is the outer side Dro in the radial direction Dr. That is, the jig protrusion 812 is formed at a position away in the vertical direction Dv from the end surface 51 of the upper half seal portion 5A or the lower half seal portion 5B in a state where the seal removal jig 8 is fixed to the upper half seal portion 5A or the lower half seal portion 5B. The jig protrusion 812 is formed integrally with the jig contact portion 811. The jig protrusion 812 includes a supported surface 817 that comes into contact with the jack 9. The supported surface 817 is a plane facing downward in the vertical direction Dv.

The jig fixing portion 82 detachably fixes the jig body 81 to the end surface 51 of the seal portion 5. The jig fixing portion 82 of the present embodiment is a bolt member detachable from the bolt insertion hole 52. The jig fixing portion 82 is formed in a shape that allows insertion into the jig through-hole 816. The jig fixing portion 82 has a head portion having a diameter larger than that of the jig through-hole 816.

Jack

The jack 9 is a jack with a claw 91. The jack with the claw 91 is a hydraulic type, and can lift a heavy object from a low position by placing the claw 91 under the heavy object. That is, even if there is not enough space for the entire jack 9 to enter under the heavy object, the jack 9 can lift the heavy object by moving the claw 91 upward in the vertical direction Dv only by a part of the claw 91 entering under the heavy object.

Here, a position where the jig fixing portion 82 is fixed to the end surface 51 of the upper half seal portion 5A or the lower half seal portion 5B is called a fixing center position. The fixing center position is the center position of the jig through-hole 816 in the horizontal direction. A load point on the jig protrusion 812 that the jack 9 comes into contact with and a force from the jack 9 is loaded is called a loaded position. The loaded position is a position in contact with the claw 91 of the jack 9, and is a central position in the horizontal direction of a contact part between the supported surface 817 and the claw 91. Furthermore, the distance in the horizontal direction between the fixing center position and the loaded position is called a first distance A. The first distance A is a length in the horizontal direction between the fixing center position and the loaded position when viewed from the axial direction Da. That is, the first distance A is a value representing a protrusion amount in the radial direction Dr of the jig protrusion 812 from the jig contact portion 811.

The protrusion amount in the radial direction Dr of the jig protrusion 812 from the jig contact portion 811 is preferably suppressed as much as possible. Specifically, the ratio of the first distance A to the outside diameter of the seal portion 5 (the upper half seal portion 5A or the lower half seal portion 5B) is preferably 0.01 or more and 0.1 or less. The ratio of the first distance A to the outside diameter of the seal portion 5 is more preferably 0.01 or more and 0.04 or less. The ratio of the first distance A to the outside diameter of the seal portion 5 is yet more preferably 0.01 or more and 0.25 or less. In order to correspond to the seal portions 5 having a plurality of sizes, in the seal removal jig 8, the first distance A is preferably constant regardless of the outside diameter of the seal portion 5.

Seal Removal Method

The seal portion 5 as described above is removed from the casing 10 by the seal removal method S1 using the seal removal jig 8. In the seal removal method S1, the seal removal jig 8 attached to the seal portion 5 is lifted up by the jack 9, and the seal portion 5 is removed from the casing 10. Although the seal removal method S1 is applicable to both the upper half diaphragm 15A and the lower half diaphragm 15B, in the present embodiment, only the lower half seal portion 5B is removed from the lower half diaphragm 15B as an example for the sake of description. Note that the same procedure is also adopted when the upper half seal portion 5A is removed from the upper half diaphragm 15A. Therefore, when the upper half seal portion 5A is removed from the upper half diaphragm 15A, the lower half diaphragm (lower half) 15B in the following description is replaced with the upper half diaphragm (upper half) 15A, and the lower half seal portion 5B is replaced with the upper half seal portion 5A.

Figure 6:
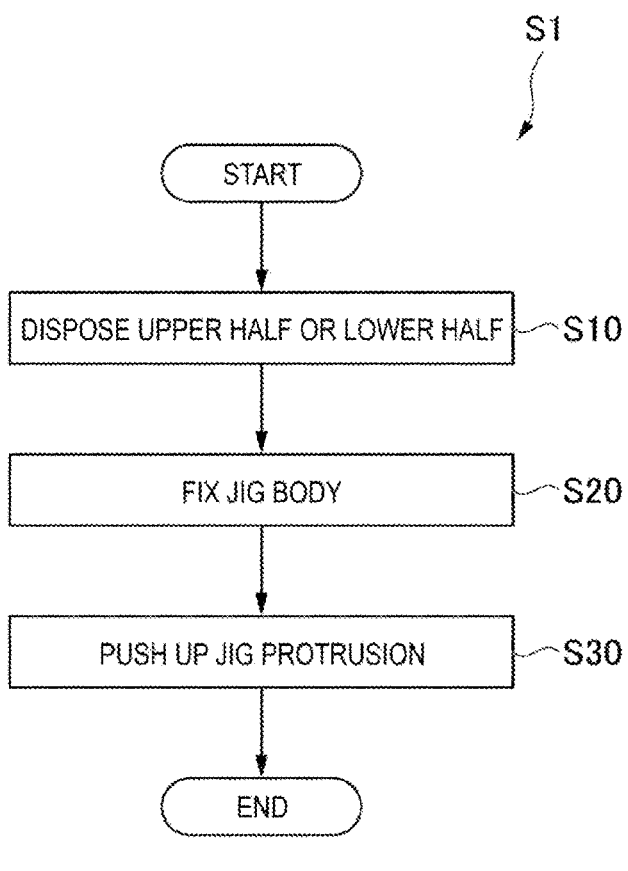
FIG. 6. is a flow diagram explaining a seal removal method of the present disclosure.

As illustrated in FIG. 6, in the seal removal method S1, first, the upper half or the lower half is disposed (step S10). Specifically, the upper half diaphragm 15A or the lower half diaphragm 15B is disposed such that the end surface 51 of the upper half seal portion 5A or the lower half seal portion 5B faces upward in the vertical direction Dv. For example, the lower half diaphragm 15B is disposed so as to open upward in the vertical direction Dv. At this time, the lower half diaphragm 15B is preferably removed from the lower half casing 11B, but may remain accommodated in the lower half casing 11B depending on the structure of the centrifugal compressor 1.

After the lower half diaphragm 15B is disposed, the seal removal jig 8 is fixed to the end surface 51 of the lower half seal portion 5B (step S20). Specifically, the jig body 81 is disposed in a state of being in contact with the end surface 51 of the lower half seal portion 5B. At this time, the jig body 81 is disposed such that the horizontal positions of the bolt insertion hole 52 and the jig through-hole 816 overlap. Thereafter, the end surface 51 of the lower half seal portion 5B and the jig body 81 are fixed by the jig fixing portion 82. Specifically, the jig fixing portion 82 is inserted into the jig through-hole 816, and the jig fixing portion 82 is fixed to the bolt insertion hole 52 in a state where the head portion of the jig fixing portion 82 is in contact with the upper end of the jig contact portion 811. Due to this, the jig body 81 is immovably fixed to the lower half seal portion 5B.

After the lower half seal portion 5B and the jig body 81 are fixed, the jig protrusion 812 is pushed upward up from below in the vertical direction Dv by the jack 9 (step S30). Specifically, the claw 91 is inserted below the jig protrusion 812 and brought into a state of being in contact with the supported surface 817. Thereafter, the jack 9 is operated to move the claw 91 upward in the vertical direction Dv. As a result, the jig protrusion 812 is pushed upward from below in the vertical direction Dv by the claw 91. Due to this, the lower half seal portion 5B is peeled off from the lower half diaphragm 15B even when the lower half seal portion 5B is pulled out from the seal insertion portion 56 inserted into the seal attachment recess 155 and the lower half seal portion 5B and the lower half diaphragm 15B are fused.

Operational Effects

In the seal removal jig 8 and the seal removal method S1 configured as described above, the jig body 81 is fixed in a state of being in contact with the lower half seal portion 5B by the jig protrusion 812. The ratio of the first distance A to the outside diameter of the seal portion 5 is 0.01 or more and 0.1 or less. That is, the fixing center position of the jig fixing portion 82 with respect to the end surface 51 of the lower half seal portion 5B and the loaded position of the jig protrusion 812 loaded with the force from the jack 9 are very close to each other. Therefore, when the jig protrusion 812 is lifted using the jack 9, it is possible to suppress the moment generated in the jig protrusion 812 about the fixing center position. Therefore, when the jig protrusion 812 is lifted up by the jack 9, the rotation of the jig body 81 with respect to the end surface 51 of the lower half seal portion 5B can be suppressed. As a result, the force received from the jack 9 can be accurately transmitted to the end surface 51 of the lower half seal portion 5B via the jig body 81. Due to this, the lower half seal portion 5B can be moved straight upward in the vertical direction Dv with respect to the lower half diaphragm 15B, and the lower half seal portion 5B can be peeled off from the lower half diaphragm 15B. Therefore, the seal portion 5 can be easily removed from the casing 10.

The jig body 81 and the jig fixing portion 82 can be independently disposed on both the end surfaces 51 of the seal portion 5 in the circumferential direction Dc. That is, two jig bodies 81 and two jig fixing portions 82 can be disposed independently with respect to one lower half seal portion 5B. Therefore, both ends of the lower half seal portion 5B can be pushed upward in the vertical direction Dv while suppressing a space occupied by the seal removal jig 8. Since the jig bodies 81 are disposed at both ends, movement amounts of both ends of the lower half seal portion 5B upward in the vertical direction Dv with respect to the lower half diaphragm 15B can be adjusted using the two jacks 9. Therefore, the lower half seal portion 5B can be peeled off from the lower half diaphragm 15B while maintaining a stable orientation. Therefore, the seal portion 5 can be more easily removed from the casing 10.

The jig protrusion 812 protrudes only toward the outer side Dro in the radial direction Dr with respect to the jig contact portion 811. Therefore, it is possible to secure a region to be brought into contact with the jack 9 while suppressing the size of the jig body 81 in the radial direction Dr.

A jack with the claw 91 is used as the jack 9. Therefore, the claw 91 can be inserted under the jig protrusion 812 without securing a large space under the jig protrusion 812. Therefore, the distance in the vertical direction Dv between the end surface 51 of the lower half seal portion 5B and the jig protrusion 812 can be suppressed. It is possible to secure a region to be brought into contact with the jack 9 while suppressing the size of the jig body 81 in the vertical direction Dv.

The seal portion 5 includes the seal insertion portion 56 to be inserted into the seal attachment recess 155. In the seal insertion portion 56, a surface opposing the recess inner surface 157 is formed only of the insertion surface 561 extending in the radial direction Dr. That is, the recess inner surface 157, which is a flat surface, and the insertion surface 561, which is a flat surface, are opposed to each other over the radial direction Dr in a state of extending in parallel. Therefore, when the seal insertion portion 56 is inserted into or removed from the seal attachment recess 155, it is possible to suppress the seal insertion portion 56 from being caught by the seal attachment recess 155. Therefore, when the seal portion 5 is removed by the seal removal jig 8, the lower half seal portion 5B can be removed from the lower half diaphragm 15B with suppressed drag. Due to this, the seal portion 5 can be more easily removed from the casing 10.

Movement in the vertical direction Dv of the lower half seal portion 5B is restricted by the restriction bolt 19 fixed to the lower half diaphragm 15B, whereby the lower half seal portion 5B cannot fall off from the lower half diaphragm 15B. Therefore, even with a structure in which the seal insertion portion 56 is not caught by the seal attachment recess 155, it is possible to suppress falling of the lower half seal portion 5B from the lower half diaphragm 15B.

Other Embodiments

An embodiment according to the present disclosure has been described in detail with reference to the drawings. However, the specific configuration of the present disclosure is not limited to this embodiment. Design change without departing from the main gist of the present disclosure or the like is also included.

The casing 10 is not limited to the structure including the external casing 11 and the diaphragm 15. For example, the casing 10 may have a structure without the diaphragm 15. In the case of such a structure, the seal portion 5 is directly attached with the upper half seal portion 5A and the lower half seal portion 5B to the upper half and the lower half of the casing 10 having a semi-annular shape.

The centrifugal compressor 1 is not limited to a straight type uniaxial multistage centrifugal compressor in which all the impellers 22 face the same direction as in the present embodiment. The centrifugal compressor 1 may be a back-to-back type uniaxial multistage centrifugal compressor in which the impeller 22 faces in the opposite direction in the axial direction Da, or a geared compressor.

The seal portion 5 to be removed by the seal removal jig 8 is not limited to a structure having only the seal body 55 and the seal insertion portion 56 as in the present embodiment. For example, the seal portion 5 may have a structure in which a recess or a protrusion is formed in the seal insertion portion 56.

The seal removal jig 8 is not limited to the structure as in the present embodiment. For example, the seal removal jig 8 is not limited to a structure in which the seal removal jig 8 is independently and simultaneously disposed on both of the end surfaces 51 of the upper half seal portion 5A and the lower half seal portion 5B in the circumferential direction Dc. The seal removal jig 8 is not limited to a structure having only the jig contact portion 811 and the jig protrusion 812.

SUPPLEMENTARY NOTES

The seal removal jig 8, the seal removal method S1, and the seal portion 5 described in the embodiment are grasped as follows, for example.

(1) The seal removal jig 8 according to a first aspect is the seal removal jig 8 used for removing the seal portion 5 from the casing 10 of a rotary machine, the seal removal jig 8 including: the jig body 81 82 pushed up from below in the vertical direction Dv by the jack 9; the jig fixing portion 82 that detachably fixes the jig body 81 to the seal portion 5, in which the casing 10 includes the casing inside surface 152 configured to internally accommodate the impeller 22 rotatable about the axis O, the casing inside surface 152 opposing an outside surface of the impeller 22 in the radial direction Dr with respect to the axis O, the seal portion 5 is disposed on the casing 10 inside surface 152, and is configured to seal a gap with the impeller 22 by opposing the outside surface of the impeller 22 from an outer side Dro in the radial direction Dr, the casing 10 further includes an upper half forming an upper part in the vertical direction Dv with respect to the axis O and having a cross section perpendicular to the axis O formed in a semicircular arc shape, and a lower half forming a lower part in the vertical direction Dv with respect to the axis O and having a cross section perpendicular to the axis O formed in a semicircular arc shape, the seal portion 5 includes the upper half seal portion 5A attached to the upper half, and the lower half seal portion 5B attached to the lower half, the jig body 81 includes a jig contact portion 811 that is contactable with an end surface 51 of the upper half seal portion 5A or the lower half seal portion 5B in a circumferential direction Dc about the axis O, and the jig protrusion 812 protruding toward the outer side Dro in the radial direction Dr with respect to the jig contact portion 811 and pushed up from below in the vertical direction Dv by the jack 9, and a ratio of the first distance A to an outside diameter of the upper half seal portion 5A or the lower half seal portion 5B is 0.01 or more and 0.1 or less when a distance in a horizontal direction between a fixing center position of the jig fixing portion 82 with respect to the end surface 51 and a loaded position of the jig protrusion 812 that the jack 9 comes into contact with and a force from the jack 9 is loaded to is the first distance A.

According to such a configuration, the fixing center position of the jig fixing portion 82 with respect to the end surface 51 of the upper half seal portion 5A or the lower half seal portion 5B and the loaded position of the jig protrusion 812 loaded with the force from the jack 9 are very close to each other. Therefore, when the jig protrusion 812 is lifted using the jack 9, it is possible to suppress the moment generated in the jig protrusion 812 about the fixing center position. Therefore, when the jig protrusion 812 is lifted up by the jack 9, the rotation of the jig body 81 with respect to the end surface 51 of the upper half seal portion 5A or the lower half seal portion 5B can be suppressed. As a result, the force received from the jack 9 can be accurately transmitted to the end surface 51 of the upper half seal portion 5A or the lower half seal portion 5B via the jig body 81. Due to this, the upper half seal portion 5A can be moved straight upward in the vertical direction Dv with respect to the upper half diaphragm 15A, and the upper half seal portion 5A can be peeled off from the upper half diaphragm 15A. Similarly, the lower half seal portion 5B can be moved straight upward in the vertical direction Dv with respect to the lower half diaphragm 15B, and the lower half seal portion 5B can be peeled off from the lower half diaphragm 15B. Therefore, the seal portion 5 can be easily removed from the casing 10.

(2) The seal removal jig 8 according to a second aspect is the seal removal jig 8 of (1), in which the jig body 81 and the jig fixing portion 82 are configured to be independently disposed on both of the end surfaces 51 of the upper half seal portion 5A or the lower half seal portion 5B in the circumferential direction Dc.

According to such a configuration, two jig bodies 81 and two jig fixing portions 82 can be disposed in a state of being independent with respect to one upper half seal portion 5A or one lower half seal portion 5B. Therefore, both ends of the upper half seal portion 5A or the lower half seal portion 5B can be pushed upward in the vertical direction Dv while suppressing a space occupied by the seal removal jig 8. Since the jig bodies 81 are disposed at both ends, the movement amount of both ends of the upper half seal portion 5A upward in the vertical direction Dv with respect to the upper half diaphragm 15A can be adjusted using two jacks 9. Therefore, the upper half seal portion 5A can be peeled off from the upper half diaphragm 15A while maintaining a stable orientation. Similarly, the movement amount of both ends of the lower half seal portion 5B upward in the vertical direction Dv with respect to the lower half diaphragm 15B can be adjusted. Therefore, the lower half seal portion 5B can be peeled off from the lower half diaphragm 15B while maintaining a stable orientation. Therefore, the seal portion 5 can be more easily removed from the casing 10.

(3) The seal removal jig 8 according to a third aspect is the seal removal jig 8 of (1) or (2), in which the jig protrusion 812 protrudes only toward the outer side Dro in the radial direction Dr with respect to the jig contact portion 811.

According to such a configuration, it is possible to secure a region to be brought into contact with the jack 9 while suppressing the size of the jig body 81 in the radial direction Dr.

(4) The seal removal method S1 according to a fourth aspect is the seal removal method S1 using the seal removal jig 8 of any one of (1) to (3), the seal removal method S1 including the steps of: disposing the upper half or the lower half such that the end surface 51 of the upper half seal portion 5A or the lower half seal portion 5B faces upward in the vertical direction Dv; disposing the jig body 81 on the end surface 51 in a state of being in contact and fixing the end surface 51 and the jig body 81 with the jig fixing portion 82; and pushing up the jig protrusion 812 upward from below in the vertical direction Dv by the jack 9.

According to such a configuration, two jig bodies 81 and two jig fixing portions 82 can be disposed in a state of being independent with respect to one upper half seal portion 5A or one lower half seal portion 5B. Therefore, both ends of the upper half seal portion 5A or the lower half seal portion 5B can be pushed upward in the vertical direction Dv while suppressing a space occupied by the seal removal jig 8. Since the jig bodies 81 are disposed at both ends, the movement amount of both ends of the upper half seal portion 5A upward in the vertical direction Dv with respect to the upper half diaphragm 15A can be adjusted using two jacks 9. Therefore, the upper half seal portion 5A can be peeled off from the upper half diaphragm 15A while maintaining a stable orientation. Similarly, the movement amount of both ends of the lower half seal portion 5B upward in the vertical direction Dv with respect to the lower half diaphragm 15B can be adjusted. Therefore, the lower half seal portion 5B can be peeled off from the lower half diaphragm 15B while maintaining a stable orientation. Therefore, the seal portion 5 can be more easily removed from the casing 10.

(5) The seal removal method S1 according to a fifth aspect is the seal removal method S1 of (4), in which the jack 9 is the jack 9 with the claw 91, and after a non-contact surface facing downward in the vertical direction Dv of the jig protrusion 812 and an upper surface facing upward in the vertical direction Dv of the claw 91 of the jack 9 are brought into contact with each other, the jig protrusion 812 is pushed upward from below in the vertical direction Dv.

According to such a configuration, the claw 91 can be inserted under the jig protrusion 812 without securing a large space under the jig protrusion 812. Therefore, the distance in the vertical direction Dv between the end surface 51 of the upper half seal portion 5A or the lower half seal portion 5B and the jig protrusion 812 can be suppressed. It is possible to secure a region to be brought into contact with the jack 9 while suppressing the size of the jig body 81 in the vertical direction Dv.

(6) The seal portion 5 according to a sixth aspect is the seal portion 5 configured to seal a gap between the casing 10 including the casing inside surface 152 configured to internally accommodate the impeller 22 rotatable about the axis O, the casing inside surface 152 opposing an outside surface of the impeller 22 in the radial direction Dr with respect to the axis O, an upper half forming an upper part in a vertical direction Dv with respect to the axis O and having a cross section perpendicular to the axis O formed in a semicircular arc shape, and a lower half forming a lower part in the vertical direction Dv with respect to the axis O and having a cross section perpendicular to the axis O formed in a semicircular arc shape and the impeller 22, in which a cross-sectional shape of the seal portion 5 when viewed from the circumferential direction Dc about the axis O is formed in an L shape, the seal portion 5 is disposed on the casing inside surface 152 so as to oppose an outside surface of the impeller 22 from the outer side Dro in the radial direction Dr, the seal portion 5 includes the upper half seal portion 5A attached to the upper half and the lower half seal portion 5B attached to the lower half, the seal attachment recess 155 recessed in the radial direction Dr from the casing inside surface 152 is formed in the upper half and the lower half, the upper half seal portion 5A and the lower half seal portion 5B include the seal body 55 in which the seal surface 551 opposing the outside surface of the impeller 22 from the outer side Dro in the radial direction Dr is formed, and the seal insertion portion 56 protruding from the seal body 55 in the radial direction Dr and insertable in the radial direction Dr into the seal attachment recess 155, and in the seal insertion portion 56, a surface opposing the recess inner surface 157 extending in the radial direction Dr in the seal attachment recess 155 is formed only of the insertion surface 561 configured to come into slide contact with the recess inner surface 157 and extends in the radial direction Dr.

According to such a configuration, the recess inner surface 157 and the insertion surface 561, which is a flat surface, oppose each other over the radial direction Dr. Therefore, when the seal insertion portion 56 is inserted into or removed from the seal attachment recess 155, it is possible to suppress the seal insertion portion 56 from being caught by the seal attachment recess 155. Therefore, when the seal portion 5 is removed by the seal removal jig 8, the upper half seal portion 5A can be removed from the upper half diaphragm 15A with suppressed drag. Similarly, the lower half seal portion 5B can be removed from the lower half diaphragm 15B with suppressed drag. Due to this, the seal portion 5 can be more easily removed from the casing 10.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A seal removal jig used for removing a seal portion from a casing of a rotary machine, the seal removal jig comprising:
   a jig body configured to be pushed up from below in a vertical direction by a jack; and
   a jig fixing portion configured to detachably fix the jig body to the seal portion,
   wherein the casing includes a casing inside surface configured to internally accommodate an impeller rotatable about an axis, the casing inside surface opposing an outside surface of the impeller in a radial direction with respect to the axis,
   the seal portion is disposed on the casing inside surface, and is configured to seal a gap with the impeller by opposing the outside surface of the impeller from an outer side in the radial direction,
   the casing further includes
   an upper half forming an upper part in the vertical direction with respect to the axis and having a cross section perpendicular to the axis formed in a semicircular arc shape, and
   a lower half forming a lower part in the vertical direction with respect to the axis and having a cross section perpendicular to the axis formed in a semicircular arc shape,
   the seal portion includes
   an upper half seal portion configured to be attached to the upper half, and
   a lower half seal portion configured to be attached to the lower half,
   the jig body includes
   a jig contact portion configured to come into contact with an end surface of the upper half seal portion or the lower half seal portion in a circumferential direction about the axis, and
   a jig protrusion protruding outward in the radial direction with respect to the jig contact portion and configured to be pushed up from below in the vertical direction by a jack, and
   a ratio of a first distance to an outside diameter of the upper half seal portion or the lower half seal portion is 0.01 or more and 0.1 or less when a distance in a horizontal direction between a fixing center position of the jig fixing portion with respect to the end surface and a loaded position of the jig protrusion that the jack comes into contact with and to which a force from the jack is applied is the first distance.

2. The seal removal jig according to claim 1, wherein the jig body and the jig fixing portion are configured to be independently disposed on both end surfaces of the upper half seal portion or the lower half seal portion in the circumferential direction.

3. The seal removal jig according to claim 1, wherein the jig protrusion protrudes only outward in the radial direction with respect to the jig contact portion.

4. A seal removal method using the seal removal jig according to claim 1, the seal removal method comprising steps of:
   disposing the upper half or the lower half such that the end surface of the upper half seal portion or the lower half seal portion faces upward in the vertical direction;
   disposing the jig body on the end surface in a state of being in contact and fixing the end surface and the jig body with the jig fixing portion; and
   pushing up the jig protrusion upward from below in the vertical direction by the jack.

5. The seal removal method according to claim 4, wherein the jack is a claw-attached jack, and after a non-contact surface facing downward in the vertical direction of the jig protrusion and an upper surface facing upward in the vertical direction of a claw of the jack are brought into contact with each other, the jig protrusion is pushed upward from below in the vertical direction.

\* \* \* \* \*